United States Patent Office 3,431,151

Patented Mar. 4, 1969

3,431,151

POLYESTER RESINS

Dorothy Ann Carvalho, East Norwich, N.Y., and Martin Hauser, Edward John Schriffert, and George Sidney Sprague, Stamford Conn., assignors to American Cyanamid Company, Stamford, Conn. a corporation of Maine.

No Drawing. Filed Feb. 23, 1967, Ser. No. 619,119
U.S. Cl. 149—19 8 Claims
Int. Cl. C06b *1/00, 11/00;* C08g *17/08*

ABSTRACT OF THE DISCLOSURE

The invention relates to polyester resins of the formula $$\left[-A-\overset{O}{\overset{\|}{C}}-ORO-\overset{O}{\overset{\|}{C}}-\right]_x\left[-A-\overset{O}{\overset{\|}{C}}-O\underset{\underset{R'}{|}}{R}O-\overset{O}{\overset{\|}{C}}-\right]_y$$

wherein A is a

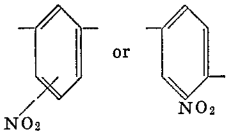

group, R is an alkylene, a $—(CH_2)_n—O—(CH_2)_n—$ or a

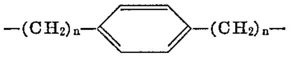

radical, *n* is a number from 1 to 10, R' is hydroxy alkyl and the ratio of *x*:*y* ranges from about 100:0 to 100:10, respectively. These polyester resins are useful as rocket propellants when admixed with a plasticizer, a fuel such as aluminum, magnesium, boron or carbon, an oxidizer such as ammonia, guanidine, hydrazine, the alkali metal or alkaline earth metal chromates, dichromates, permanganates, nitrates, chlorates or perchlorates and a cross linking agent.

BACKGROUND OF THE INVENTION

This application relates to the art of rocket propellant compositions.

SUMMARY

The new polyesters set forth herein are produced from nitroisophthalic and nitroterephthalic acids and various polyhydroxy compounds. The polyester resins are energetic and thermally stable, i.e. up to about 150° C., and are very miscible with high energy nitro-containing plasticizers. They are carboxy-terminated and therefore may be easily cross-linked to a thermoset state by known procedures.

DESCRIPTION OF THE INVENTION INCLUDING PREFERRED EMBODIMENTS

The polyester resins of our invention may be represented by recurring units of the formula (I)
$$\left[-A-\overset{O}{\overset{\|}{C}}-ORO-\overset{O}{\overset{\|}{C}}-\right]_x\left[-A-\overset{O}{\overset{\|}{C}}-O\underset{\underset{R'}{|}}{R}O-\overset{O}{\overset{\|}{C}}-\right]_y$$

wherein A is a

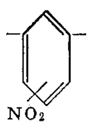

group or a

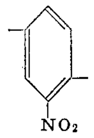

group, R is an alkylene radical, a $$—(CH_2)_n—O—(CH_2)_n—$$

radical or a

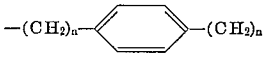

radical, wherein *n* is a whole positive integer of 1–10, inclusive, R' is a hydroxy containing alkyl radical and the ratio of *x*:*y* ranges from about 100:0 to 100:10, respectively, preferably 100:1 to 100:5.

The molecular weights of our novel polyesters range from about 1000 to about 30,000.

The polyesters may be produced by reacting a nitroisophthalic acid or nitroterephthalic acid with a suitable dihydric alcohol or mixtures of a dihydric alcohol and a polyhydric alcohol. We may use an equimolar amount of acid and alcohol, however, it is preferred that a slight excess of acid be utilized in order to produce polyesters having terminal carboxyl group available for cross-linking.

The reaction is conducted at the reflux (boiling) temperature of the specific compound which is used as a solvent for the charge materials. We have found that any aromatic compound which will azeotrope with water may be used for this purpose. Examples of representative solvents include benzene, toluene, xylene and the like. The reaction is preferably conducted at atmospheric pressure although higher or lower pressure may be utilized if corresponding changes are made in the temperature to which the reaction media is heated.

The reaction must be conducted in the presence of from about 0.1–10%, by weight, preferably 1.0–3.0%, of a strong acid. The acid acts as a catalyst and any known material may be used for this purpose. Examples include $HNO_3$, $H_2SO_4$, HCl, $H_3PO_4$, p-toluenesulfonic acid and the like.

The reactants, i.e. the acid and the dihydric alcohol should be reacted, as mentioned above, utilizing a slight excess of acid. When mixtures of the dihydric alcohol and a polyhydric alcohol are used, the polyhydric alcohol should be present in amounts of from about 1% to about 10%, by weight, of the dihydric alcohol. The use of such alcohol mixtures results in polyesters having pendant hydroxyalkyl groups as represented by R' in Formula I, above.

The reaction should be allowed to continue until the theoretical amount of water is driven off. In this manner, the highest molecular weight polyesters may be produced.

The polyesters of our invention may alternatively be prepared by solution polymerization of the acyl dihalides of the nitroacids and the alkali metal salts of the alcohols. Additionally, melt polymerization of the acid halide or acid with the alcohol can be used.

Examples of acids which may be used to produce our novel polyesters include 2-nitroisophthalic acid, 4-nitroisophthalic acid, 5- nitroisophthalic acid and nitroterephthalic acid.

Examples of suitable dihydric alcohols include ethylene glycol, 1,2-propylene glycol, trimethylene glycol, tetramethylene glycol, pentamethylene glycol, hexamethylene glycol, nonamethylene glycol, diethylene glycol, dipropylene glycol, dibutylene glycol, dinonylene glycol, α,α'-dihydroxy-p-xylene, β,β'-dihydroxy-p-diethylbenzene, α,α′-dihydroxy-p-dinonylbenzene, β,β′-dihydroxy-p-didecylbenzene and the like.

Examples of polyhydric alcohols which can be used in admixture with the above mentioned dihydric alcohols include glycerol, 1,2,3-dihydroxy butane, erythritol, dulcitol, trimethylolpropane and the like.

The polyesters of our invention are low melting energetic solids.

As mentioned briefly above, our polyesters are useful as binders in the preparation of rocket propellant compositions and explosives. For example, one can prepare a rocket propellant or explosive by incorporating a fuel such as aluminum, magnesium, boron, carbon etc., oxidizers such as the chromates, dichromates, permanganates, nitrates, chlorates, and perchlorates of the alkali and alkaline earth metals such as sodium, potassium, calcium and the like; ammonia; hydrazine; guanidine, etc. in our novel binder polyesters along with a suitable plasticizer such as bis (2,2-dinitro-2-fluoroethyl) formal or those disclosed in U.S. patent application Ser. No. 619,120 filed concurrently herewith. The resultant compositions may be cross linked, with the various triaziridines such as those disclosed in copending applications, Ser. Nos. 605,146; 605,148; and 605,149, filed Dec. 23, 1966, and Ser. No. 574,936, filed Aug. 25, 1966.

The bis(2,2-dinitro-2-fluoroethyl) formed is a known plasticizer and may be prepared by reacting tetranitromethane with hydrogen peroxide and sodium hydroxide to give the sodium salt of trinitromethane which is converted by direct fluorination to fluorotrinitromethane. Fluorotrinitromethane, on treatment with hydrogen peroxide and sodium hydroxide, followed by formaldehyde then results in the production of 2,2-dinitro-2-fluoroethanol. This alcohol is then converted to the formal by reaction with formaldehyde.

The following examples are set forth by way of illustration only and are not to be construed as limitations of the instant invention except as set forth in the appended claims. All parts and percentages are by weight unless otherwise specified.

Example I

To a suitable reaction vessel is added a mixture of 21 parts of 5-nitroisophthalic acid, 0.2 part of diethylene glycol, 0.64 part of trimethylol propane, 0.25 part of p-toluene sulfonic acid and 100 parts of xylene. The mixture is refluxed for 16 hours and the water, codistilling off with the xylene, is separated in a trap. The mixture is cooled and forms into two layers. The upper xylene layer is discarded. The lower layer is dried for 36 hrs. at 80° C. in vacuo to give a 90% yield of polymer. The polymer is a brittle, amorphous solid polyester liquifying at 65–85° C. At 150° C. for 48 hrs. the polymer releases no gas.

Example II 25 weight percent of the polymer of Example I and 75 weight percent of bis(2,2-dinitro-2-fluoroethyl)formal, as a solution, are charged to a suitable vessel. To 10.8 parts of the solution are added 0.21 part of hexahydro-1,3,5-tris(N-aziridinylpropionyl)s-triazine. The resulting solution is blended with 12.0 parts of aluminium perchlorate, and 8.0 parts of powdered aluminum. The composition, is maintained at 25° C. for 24 hrs. and then heated for 4 hrs. at 75° C. The resultant product is a tough, resilient elastomer. In a Taliani test at 100° C., the product released 1.1 cc. of gas per gram after 90 hrs.

Following the procedure of Example 1 various other polyester resins were prepared. The results are set forth in the following Table.

TABLE

| Ex. | Acid | Alcohol | Product |
|---|---|---|---|
| 3 | 2-nitroisophthalic acid | 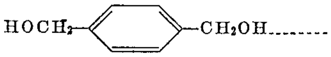 | Hard, polyester resin. |
| 4 | Nitroterephthalic acid | Hexamethylene glycol | Hard, amorphous polyester resin. |
| 5 | do | Dibutylene glycol and glycerol | Brittle, branched polyester resin. |
| 6 | 5-nitroisophthalic acid | 1,2-propylene glycol and 1,2,3-trihydroxybutane. | Do. |
| 7 | 4-nitroisophthalic acid | 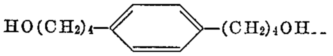 | Hard, polyester resin. |

Examples VIII–XII

Following the procedure of Example II, the polyester resins of Examples III–VII were individually blended with a cross-linking agent, a plasticizer, an oxidizer, and a fuel and cured to an elastomeric condition. All of the resultant compositions exhibited properties comparable to that of Example II indicating their usefulness as rocket propellants and explosives.

We claim:

1. A polyester resin comprising recurring units of the formula $$\left[-A-\overset{O}{\overset{\|}{C}}-ORO-\overset{O}{\overset{\|}{C}}-\right]_x \left[-A-\overset{O}{\overset{\|}{C}}-O\underset{\underset{R'}{|}}{R}O-\overset{O}{\overset{\|}{C}}-\right]_y$$

wherein A is selected from the group consisting of a

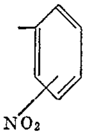

group and a

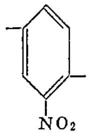

group, R is selected from the group consisting of an alkylene radical, a $-(CH_2)_n-O-(CH_2)_n-$ radical and a

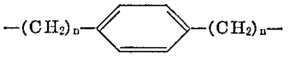

radical, wherein $n$ is a whole, positive integer of 1–10 inclusive, R′ is an hydroxy containing alkyl radical and the ratio of $x:y$ ranges from about 100:0 to 100:10, respectively.

2. A polyester according to claim 1 wherein A is a

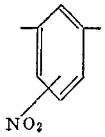

group.

3. A polyester according to claim 1 wherein A is a

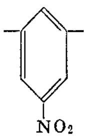

group.

4. A polyester according to claim 1 wherein R is an alkylene radical.

5. A rocket propellant composition or explosive comprising a plasticizer, a fuel selected from the group consisting of aluminum, magnesium, boron and carbon, an oxidizer selected from the group consisting of ammonia, guanidine, hydrazine and the alkali metal or alkaline earth metal chromates, dichromates, permanganates, nitrates, chlorates or perchlorates, a cross-linking agent and the polyester of claim 1.

6. A composition according to claim 5 wherein A is a

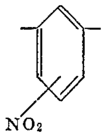

group.

7. A composition according to claim 5 wherein A is a

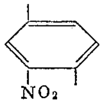

group.

8. A composition according to claim 5 wherein R is an alkylene group.

References Cited

UNITED STATES PATENTS

| | | | |
|---|---|---|---|
| 3,044,123 | 7/1962 | Grubaugh -------- | 149—105 X |
| 3,247,162 | 4/1966 | Newland et al. ------ | 260—75 X |
| 3,310,512 | 3/1967 | Curtice. | |

LELAND A. SEBASTIAN, *Primary Examiner.*

U.S. Cl. X.R.

14—20, 22, 36, 39, 44, 62, 83, 105, 109; 260—75